United States

Fleischman

4,057,329

Nov. 8, 1977

[54] ADJUSTABLE FOCAL LENGTH OPTICAL DESIGN

[75] Inventor: Andor A. Fleischman, Northbrook, Ill.

[73] Assignee: Bell & Howell Company, Chicago, Ill.

[21] Appl. No.: 712,637

[22] Filed: Aug. 9, 1976

[51] Int. Cl.² ............................................. G02B 9/42
[52] U.S. Cl. ................................................. 350/222
[58] Field of Search ...................................... 350/222

[56] References Cited

FOREIGN PATENT DOCUMENTS 1,183,266  12/1964  Germany ............................. 350/222

*Primary Examiner*—Conrad J. Clark
*Attorney, Agent, or Firm*—Roger M. Fitz-Gerald; John E. Peele, Jr.; Aaron Passman

[57] ABSTRACT

A photographic objective comprises a plurality of lens elements, the outer two of which are adjustable axially by a small amount for fine adjustment of the focal length of the lens system to permit matching mass produced lens systems in pairs so that the focal lengths of every pair of such lenses can be adjusted within very close tolerances.

1 Claim, 18 Drawing Figures

F/5.82

F/8.31

18.61°

13.40°

ADJUSTABLE FOCAL LENGTH OPTICAL DESIGN

This invention relates to an optical system for image recording and reproducing devices wherein pairs of images are reduced or magnified by high ratios, by the optical systems which are matched in focal length to exceptionally small tolerances.

Objective lenses for image recording and reproducing devices, such as microfilm recorders or reproducers, are intended to reduce and enlarge the subject by a high ratio. Due to the high magnification or high reduction ratio, optical corrections and performance characteristics must be maintained at extremely high levels. Further, in devices in which two or more images are to be compared, the respective lens system must be matched to within very small tolerances.

As individual lens elements are manufactured in lots, slight variations from specification often remain due to the separate grinding and polishing operations. Upon assembly of the elements into optical systems, slight focal length differences may result which differences are acceptable for individual optical systems but become obvious and objectionable when critically matched optical systems are required. In the past, matched systems were obtained by manual selection and matching of pairs of lens systems. Although the materials could be recorded on and reproduced by matched lens systems on a single device, the differences in the focal lengths between systems of devices became obvious when the recorded materials from different devices were to be compared, perhaps on yet another device. To match optical systems in pairs requires significant amounts of manual labor, which would be multiplied when efforts are made to further match all lens systems of a particular series of recording and reproducing devices. Alternatively, the lens elements may be manufactured with extreme care and assembled with even greater care to obtain and maintain the close tolerances necessary for the critically matched focal lengths. Either method of manufacture and assembly results in an optical system which is undesirably expensive.

To reduce the cost of manufacturing pairs or sets of lenses which are matched critically as to focal length, a lens system has been designed with elements adjustable within a small range for "fine tuning" of the focal length. The system has been designed with optical performance characteristics and corrections at least comparable to the characteristics and corrections of existing lens systems in the same range of magnification or reduction and focal length. Since adjustment of the outer elements of the lens system can be readily performed during assembly, the lens system, can be "tuned" to a specific focal length regardless of the build-up of acceptable tolerances during manufacture of the individual elements. Thus, mass production methods can be maintained with their attendant cost reductions enabling exceptionally high quality and closely matched sets of lens systems to be provided at a nominal cost. Hence, the resulting lens systems can be selected randomly with assurance that their respective focal lengths will be matched and materials recorded in one device may be reproduced in another.

An object of the invention is to provide mass produced optical systems of high performance which, during assembly, can be matched critically as to focal length by fine adjustment of outer elements of the system to compensate for tolerance variations during manufacture.

The above and other objects and advantages of the invention will become apparent from the detailed description which follows when considered in conjunction with the accompanying drawings.

Figure 1:
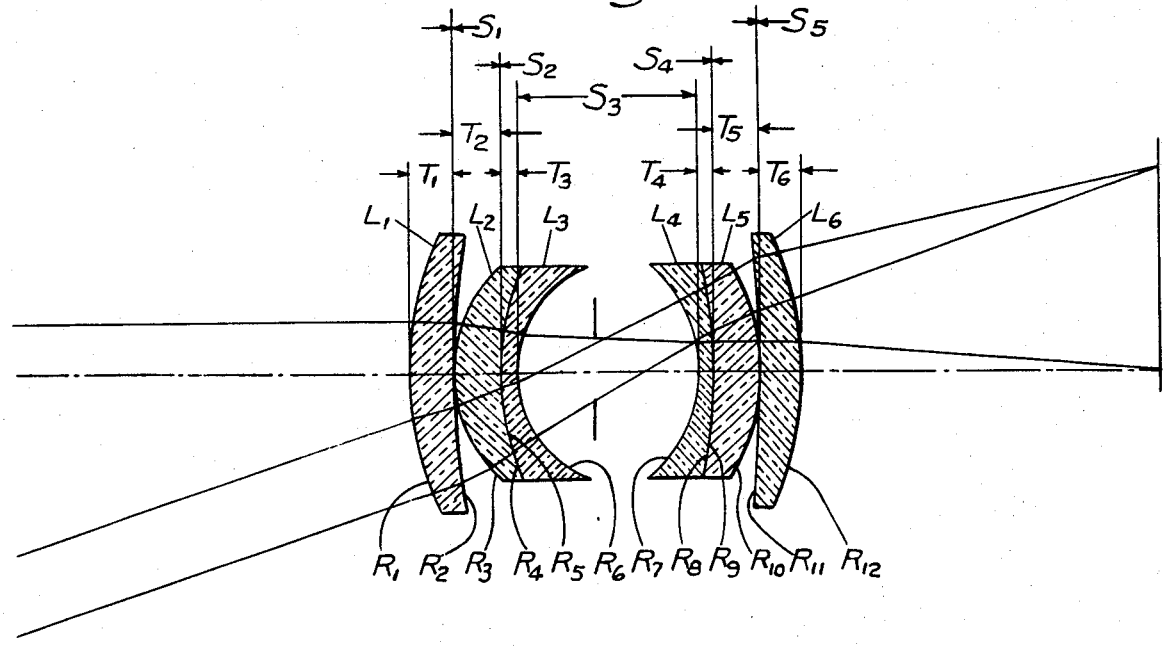
FIG. 1 is a diagrammatical sectional view of an optical system according to the invention, with the elements adjusted to minimum focal length.

Referring to FIG. 1, an optical system for a high ratio magnification or high reduction photographic objective lens having a nominal, fixed focal length is shown. This preferred embodiment of the lens design includes six elements arranged in four components $C_1$ to $C_4$. Component $C_1$ is a positive meniscus type element $L_1$. Spaced internally from the component $C_1$ is a second component $C_2$. This latter component comprises elements $L_2$ and $L_3$ which are cemented together. Light rays passing through the components $C_1$ and $C_2$ next pass through an aperture stop prior to exiting the optical system through components $C_3$ and $C_4$. The component $C_3$ is air spaced from component $C_2$ and the stop. These components $C_2$ and $C_3$, along with the stop are fixed relative one another and the not shown lens mount in which the elements are assembled. The lens mount provides for precise positioning and spacing of the elements as well as defining limiting apertures to limit the peripheral rays which may pass through the lens system. Spacers and retainers (not shown) cooperate with the mount and the elements to maintain the positions of the elements after assembly.

A fourth component $C_4$ in the form of a negative meniscus element $L_6$ is assembled in spaced relation to component $C_3$. Element $L_6$ is adjustable axially along with component $C_1$.

In this preferred embodiment, the optical system has a nominal or mid point effective focal length of 1.53 inches (38.93mm) and a magnification ratio of 24 to 1. The effective aperture is $f/5.6$. The optical performance specification limits the format to a 12.7mm diagonal. The effective focal length range is between 1.5168 inches to 1.5492 inches (38.53mm to 39.35mm) causing the magnification ratio range to extend from a ratio of 23.787 to 1 to 24.299 to 1. Similarly, the half angle of field varies between 18.24° and 18.61°.

Referring to the elements as seen from left to right in FIG. 1, element $L_1$ is a positive element mounted in an adjustable sleeve of the lens mount (not shown) for simultaneous axial adjustment by 0.035 inches (0.8575mm). This adjustment results in altering the effective focal length of the lens system by approximately 1 percent as this first element $L_1$ and the last or sixth element $L_6$ are together moved equal amounts toward or away from the adjacent surfaces of the intermediate components $C_2$ and $C_3$. When the elements $L_1$ and $L_6$ are adjusted to obtain the desired focal length during assembly, the adjustable sleeve is fixed, as by adhesive, to the lens mount to maintain the system at the adjusted focal length.

In summary, the intermediate components $C_2$ and $C_3$ are assembled in the mount to fixed reference positions. Thereafter components $C_1$ and $C_4$ are assembled and axially adjusted simultaneously to finely adjust the focal length of the lens system. Although the latter assembly step must be carefully performed, the basic assembly steps of element selection and assembly do not require significantly greater than usual care.

The optical values of the lens system of FIG. 1 are as follows:

TABLE 1

| Lens | Radii (in.) | | Thickness (in.) | Spacing (in.) | V | $N_D$ |
|---|---|---|---|---|---|---|
| $L_1$ | $R_1 =$ | .7750 | | | | |
| | $R_2 =$ | $-1.9120$ | $T_1 = .1070$ | | 51.7 | 1.734 |
| | | | | $S_1 = .0080$ to .0430 | | |
| $L_2$ | $R_3 =$ | — | | | | |
| | $R_4 =$ | .6670 | $T_2 = .1170$ | | 55.9 | 1.651 |
| | | | | $S_2 = 0$ | | |
| $L_3$ | $R_5 =$ | .6670 | | | | |
| | $R_6 =$ | $-.2850$ | $T_3 = .0350$ | | 29.3 | 1.722 |
| | | | STOP | $S_3 = .1940$ | | |
| | | | | $S_4 = .2540$ | | |
| $L_4$ | $R_7 =$ | $-.3490$ | | | | |
| | $R_8 =$ | 1.2250 | $T_4 = .0350$ | | 36.4 | 1.620 |
| | | | | $S_5 = 0$ | | |
| $L_5$ | $R_9 =$ | $-1.2250$ | | | | |
| | $R_{10} =$ | .5180 | $T_5 = .1060$ | | 55.9 | 1.651 |
| | | | | $S_6 = .0430$ to .0080 | | |
| $L_6$ | $R_{11} =$ | $-5.8300$ | | | | |
| | $R_{12} =$ | .8010 | $T_6 = .1210$ | | 51.7 | 1.734 |
| | | | | $S_7 = .8818$ BFL | | |

Figure 2:
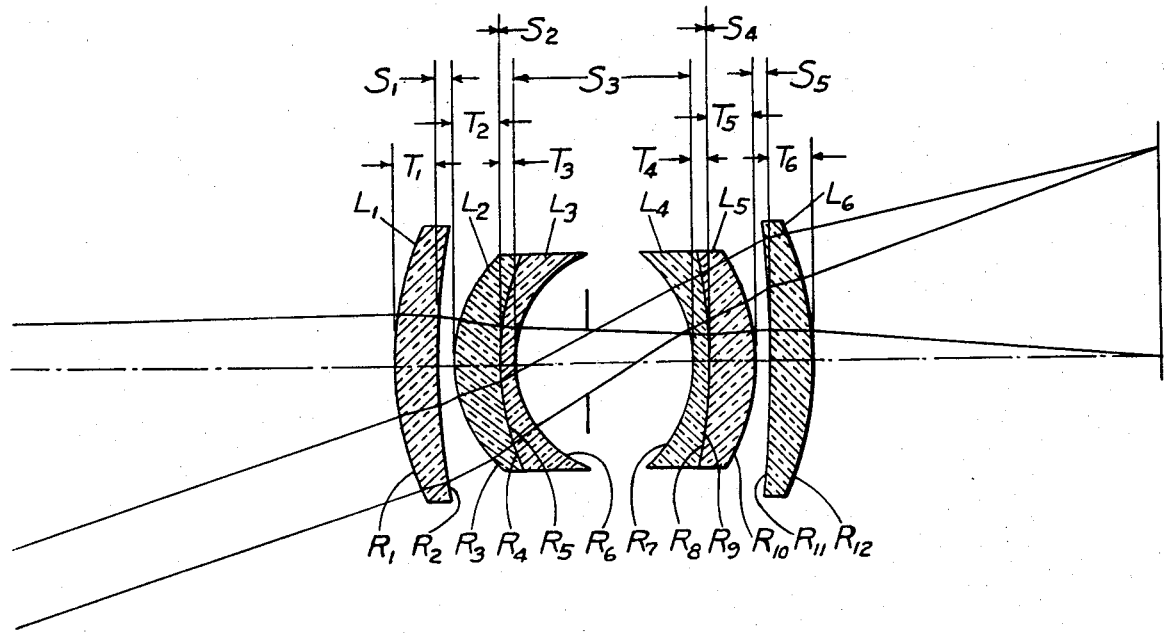
FIG. 2 is a similar view of the optical system of FIG. 1 with the elements adjusted to the maximum focal length of the optical system.

In the above table, the first column lists the lens elements $L_1$ to $L_6$ numerically starting at the left side of the lens system as shown in FIGS. 1 and 2. The second column lists the respective radii $R_1$ to $R_{12}$ of the elements; the positive and negative signs given the respective radii follow the "lensmaker's convention" to facillitate fabrication of the individual lens elements, wherein convex surfaces are positive and concave surfaces are negative. The third column lists in inches the thicknesses $T_1$ to $T_6$ of the respective elements. The fourth column lists the axial spacings (in inches) between the respective elements, the stop, and the image plane at which the light rays are imaged. The fifth and sixth columns list respectively the dispersion index V and the refractive index $N_D$.

FIGS. 3a to 3h graphically represent various aberrations related to the form of the optical system as shown schematically in FIG. 1 in the narrower angle condition and having the design data recited in Table 1.

Figure 3A:
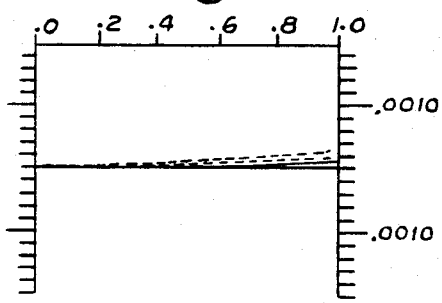
FIGS. 3a to 3h are graphical representations of the various aberrations for the minimum focal length condition of the lens system as shown in FIG. 1, and having the design data given in Table 1.
Figure 3B:
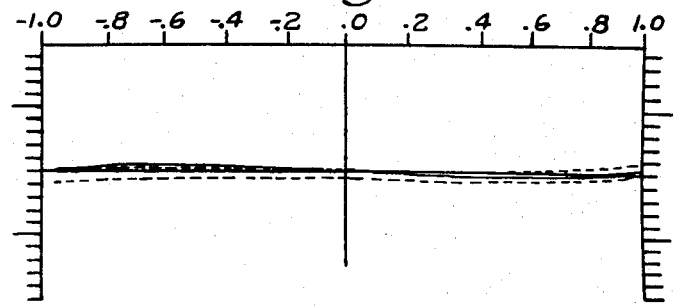
Figure 3C:
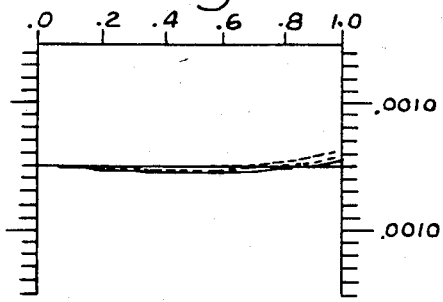
Figure 3D:
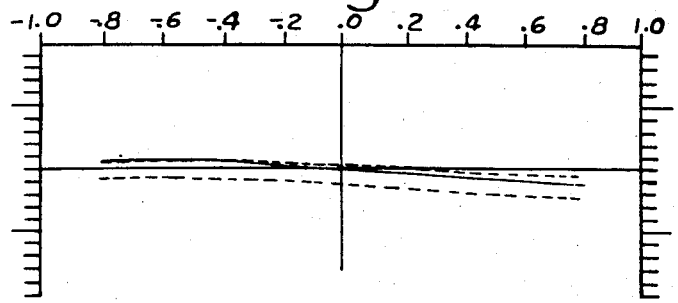
Figure 3E:
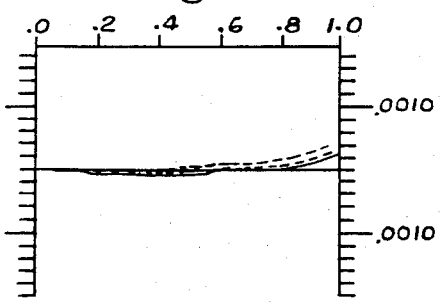
Figure 3F:
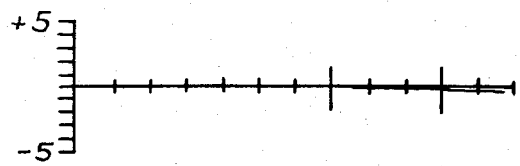
Figure 3G:
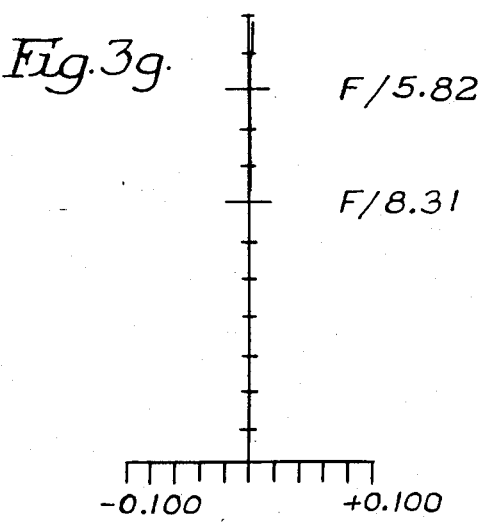
Figure 3H:
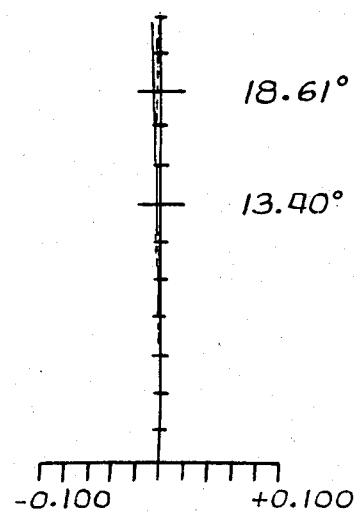
Figure 4A:
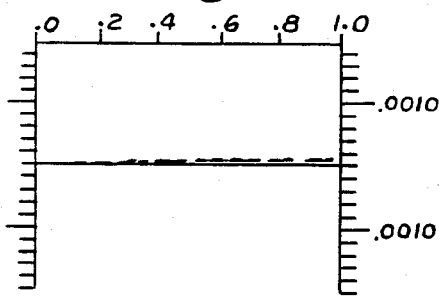
FIGS. 4a to 4h are graphical representations of the various aberrations for the maximum focal length condition of the lens system as shown in FIG. 2.
Figure 4B:
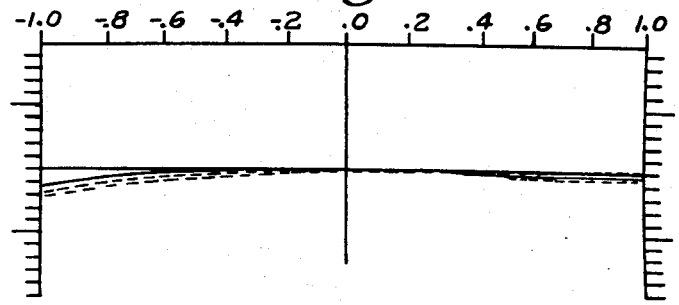
Figure 4C:
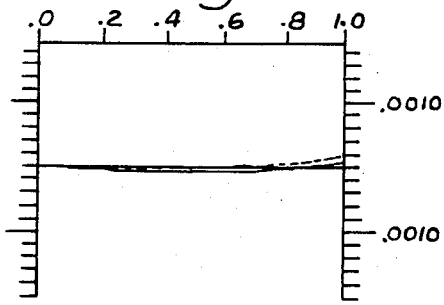
Figure 4D:
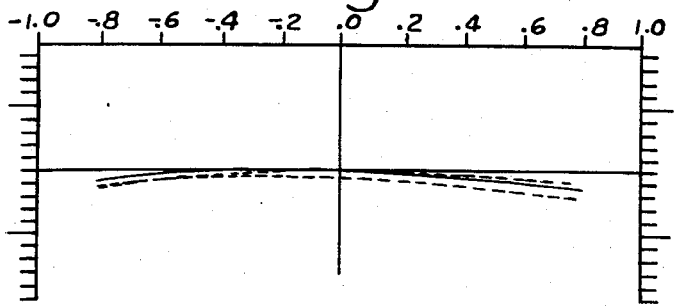
Figure 4E:
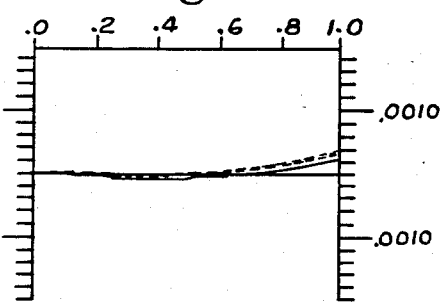
Figure 4F:
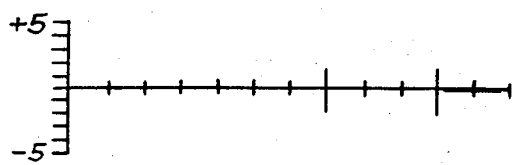
Figure 4G:
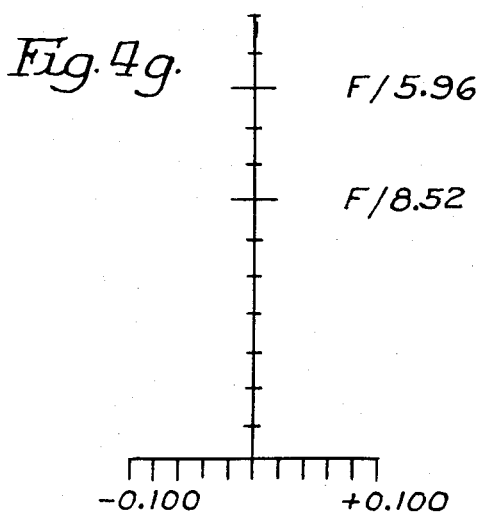
Figure 4H:
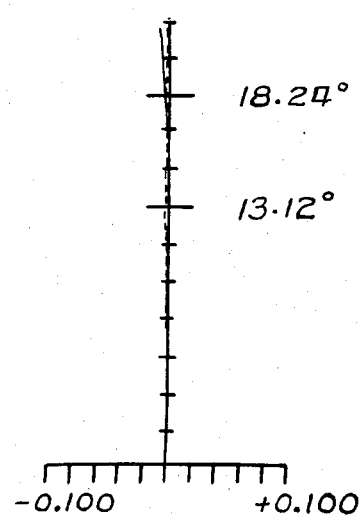

FIG. 3a represents axial chromatic correction of three typical wavelength forming rays on axis and lateral. FIG. 3b represents off axis aberrations of rays passing from the zone of the image format and through the lens transversely and tangentially. FIG. 3c represents the aberrations of the rays passing from the corner of the image format through the lens tangentially and transversely. FIG. 3d represents the radial or longitudinal aberration from the zone of the image format of rays entering the lens at 3 o'clock, while FIG. 3e represents similar aberrations from full field or corner rays. FIG. 3f represents distortion as a percentage of a "perfect" image. FIG. 3g represents the spherical aberration by a full line and the offense-against-sine-condition by the dotted line. FIG. 3h represents the curvature of field with the tangential curvature being shown in full line and the sagittal curvature being shown in dashed lines.

FIGS. 4a to 4h represent similar aberrations, related to the wider angle condition of the lens system as shown in FIG. 2, as those aberrations above identified with respect to the narrower angle condition.

What is claimed is:

1. An optical design for a photographic objective lens having a plurality of elements, the outer of which are adjustable axially for adjusting the focal length such that pairs of lenses have focal lengths within very close tolerances, the optical design having substantially the following specifications:

| Lens | Radii (in.) | | Thickness (in.) | Spacing (in.)V | $N_D$ |
|---|---|---|---|---|---|
| $L_1$ | $R_1 =$ | .7750 | | | |
| | $R_2 =$ | $-1.9120$ | $T_1 = .1070$ | | 51.7 1.734 |
| | | | | $S_1 = .0080$ to .0430 | |
| $L_2$ | $R_3 =$ | .3720 | | | |
| | $R_4 =$ | $-.6670$ | $T_2 = .1170$ | | 55.9 1.651 |
| | | | | $S_2 = 0$ | |
| $L_3$ | $R_5 =$ | .6670 | | | |
| | $R_6 =$ | $-.2850$ | $T_3 = .0350$ | | 29.3 1.722 |
| | | | | $S_3 = .1940$ | |
| | | | ------STOP------ | | |
| | | | | $S_4 = .2540$ | |
| $L_4$ | $R_7 =$ | $-.3490$ | | | |
| | $R_8 =$ | 1.2250 | $T_4 = .0350$ | | 36.4 1.620 |
| | | | | $S_5 = 0$ | |
| $L_5$ | $R_9 =$ | $-1.2250$ | | | |
| | $R_{10} =$ | .5180 | $T_5 = .1060$ | | 55.9 1.651 |
| | | | | $S_6 = .0430$ to .0080 | |
| $L_6$ | $R_{11} =$ | $-5.8300$ | | | |
| | $R_{12} =$ | .8010 | $T_6 = .1210$ | | 51.7 1.734 |
| | | | | $S_7 = .8818$ BFL | | wherein the first column lists the lens elements numerically, the second column lists the respective radii of the elements, using the convention that convex surfaces have positive radii and concave surfaces are negative, the third column lists the respective thicknesses of the elements, the fourth column lists the axial spacings between adjacent elements, the stop, and the film plane, and the fifth and sixth columns list respectively the dispersion and refractive indices of the optical materials for the lens.

* * * * *